United States Patent

[11] 3,586,385

| [72] | Inventors | Hans Jorg Florus<br>Goeppingen;<br>Horst Grossner, Geradstetten,<br>Wurttemberg, both of, Germany |
|---|---|---|
| [21] | Appl. No. | 822,970 |
| [22] | Filed | May 8, 1969 |
| [45] | Patented | June 22, 1971 |
| [73] | Assignee | Daimler-Benz Aktiengesellschaft<br>Stuttgart-Untertuerkheim, Germany |
| [32] | Priority | May 8, 1968 |
| [33] | | Germany |
| [31] | | P 17 73 376.5 |

[54] INSTALLATION FOR DETERMINING THE SLIPPAGE OF MOTOR VEHICLE WHEELS
8 Claims, 6 Drawing Figs.

[52] U.S. Cl................................................... 303/21 BF,
303/20
[51] Int. Cl....................................................... B60t 8/08

[50] Field of Search........................................ 303/20, 21;
307/231, 233, 234, 236

[56] References Cited
UNITED STATES PATENTS
3,499,689  3/1970  Carp et al. .................. 303/21 (A4)

*Primary Examiner*—Duane A. Reger
*Attorney*—Craig, Antonelli, Stewart & Hill

ABSTRACT: An installation for determining the slippage of motor vehicle wheels, in which a first frequency generator is associated with one wheel and a second frequency generator is associated with a second wheel, whereby the frequency of the second generator is several times the frequency of the first generator; both generators are connected with a counter that in turn is combined with a decoding circuit having two outputs in which signals are produced depending on whether the slippage is negative or positive.

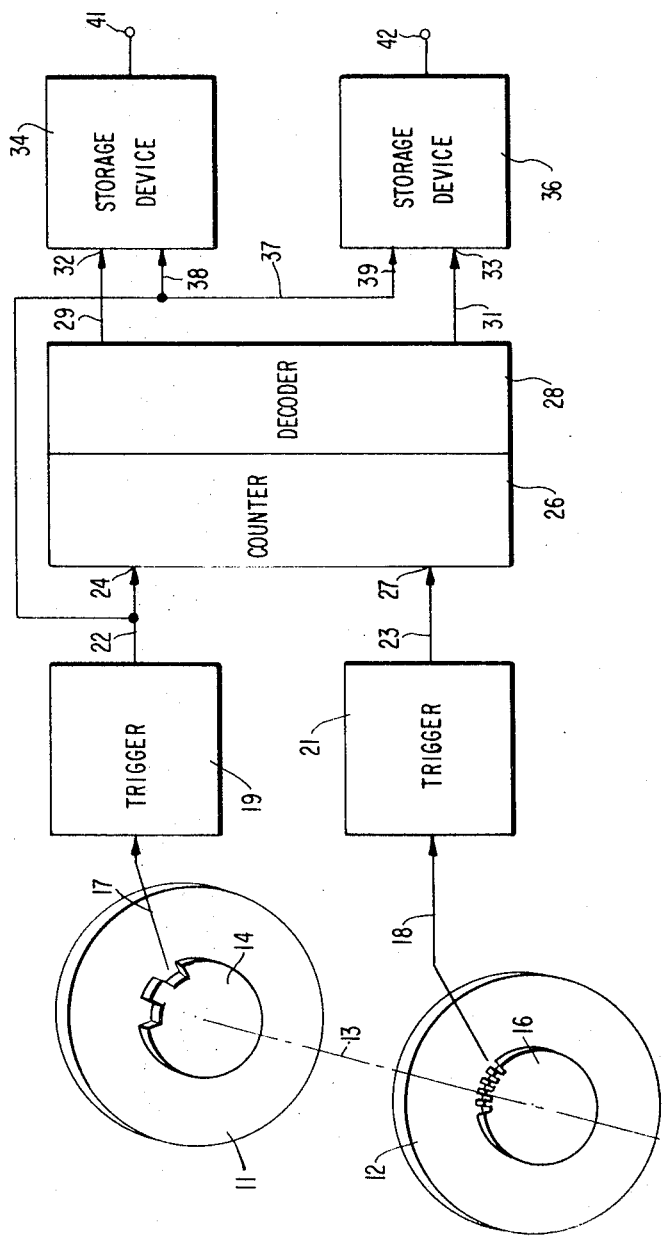
FIG. 1
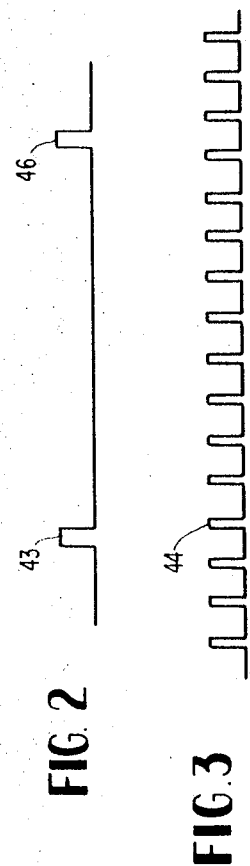
FIG. 2
FIG. 3
INVENTORS
HANS JORG FLORUS
HORST GROSSNER PATENTED JUN 22 1971 3,586,385
SHEET 2 OF 2
FIG. 4
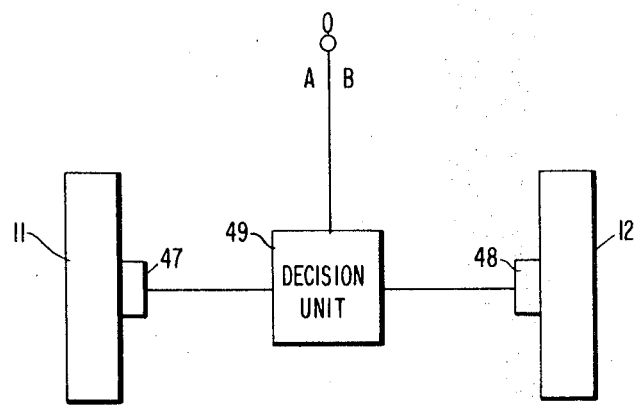
FIG. 5
| | CONDITION IN THE DECISION UNIT |
|---|---|
| WHEEL 11 SLOWER THAN WHEEL 12 | B |
| WHEEL 12 SLOWER THAN WHEEL 11 | A |
| WHEEL 11 EQUAL TO WHEEL 12 | 0 |
FIG. 6
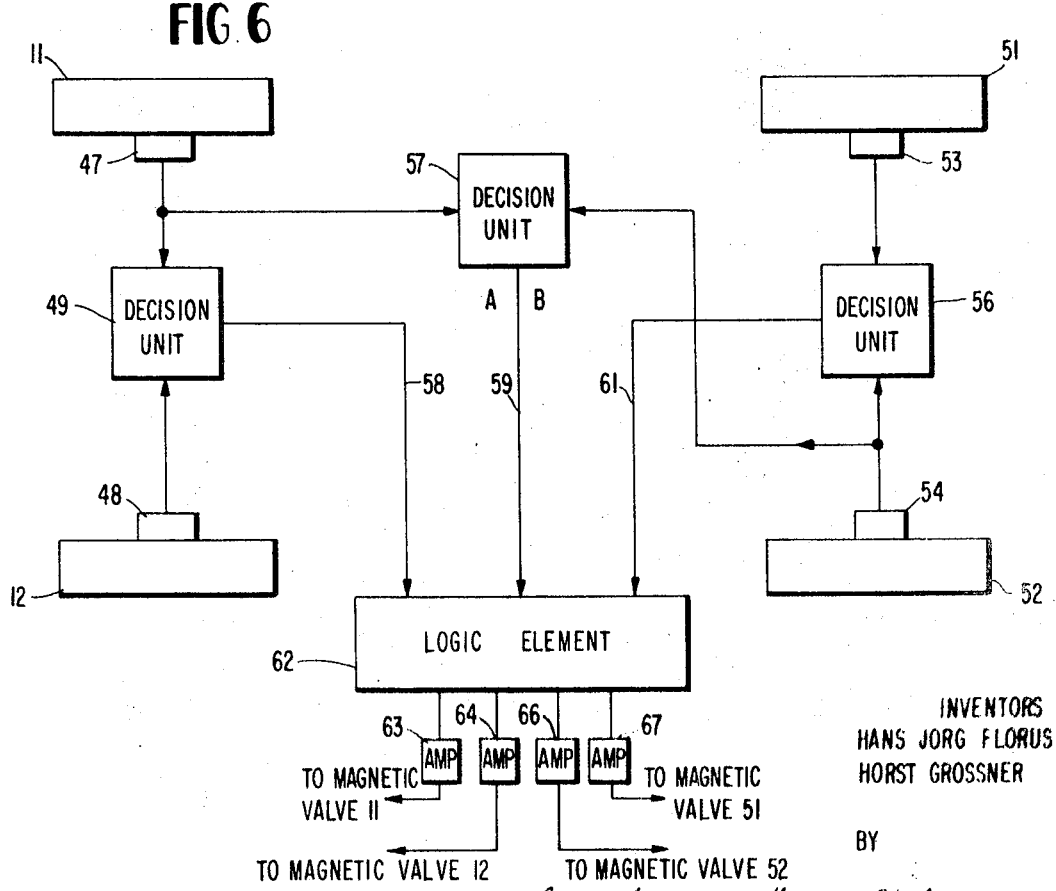
INVENTORS
HANS JORG FLORUS
HORST GROSSNER
BY
*Craig, Antonelli, Stewart & Hill* ATTORNEYS

INSTALLATION FOR DETERMINING THE SLIPPAGE OF MOTOR VEHICLE WHEELS u

The present invention relates to an installation for determining the slippage of motor vehicle wheels in which a generator is provided at a first wheel whose output frequency is proportional to $z$ with a rotational speed $u$ of this wheel.

Heretofore, one has always utilized systems operating according to the analog method for the determination of the wheel rotational speed. One has, for example, caused a toothed wheel to rotate with the vehicle wheel and one has coordinated to this toothed wheel to rotate with the vehicle wheel and one has coordinated to this toothed wheel a magnet whose flux is differently large, depending on whether its poles are opposite a tooth or a gap of the toothed wheel. The electric voltage obtained thereby by induction was then rectified and compared with an appropriate reference voltage. Depending on the results of this comparison, a valve in the brake pressure medium line was either actuated or left in its rest position.

Of decisive importance with installations of this type is that the installation operates independently of a number of operating conditions such as, for example, temperature, support and above all, also of manufacturing deviations. All structural groups must be interchangeable with each other and must produce the same results at all places.

If one now utilizes the known generator to produce voltage amplitudes, then these voltage amplitudes depend, without unreasonable expenditures, to a very large extent on the temperature, the manufacturing tolerances, etc. It would be very difficult to manufacture four identically operating generators for a four-wheel vehicle. Apart therefrom, these generators have the tendency to supply an output voltage that is not a linear function of the rotational speed.

What has been said hereinabove about generators is equally true as regards the structural groups connected in the outputs of the generators, such as, for example RC-elements, analog amplifiers, and the like ("Motor," Dec. 9, 1967, pages 46—48).

It is an object of the present invention to provide an installation of the aforementioned type which is free of these frequently uncontrollable variable parameters.

The underlying problems are solved in accordance with the present invention in that a second generator is provided at a second wheel whose output frequency, at the same rotational speed $u$ is proportional $n \cdot z$, whereby $n$ is an integer, in that both generators are connected with a conventional counter, in that the first generator is connected with an input serving both as setting—as well as reset—input of a counter and the second generator is connected with a counting input of the same counter, in that the counter is connected with a conventional decoding circuit which correlates to a predetermined counter content, a predetermined slippage rotational speed, and in that the decoding circuit has a first output for a negative slippage number and a second output for a positive slippage number.

One has produced thereby an installation operating according to the digital principle which avoids the disadvantages impairing the practical application of an analog system, without being more expensive than the same.

It is advantageous if one conventional storage device each is connected with the output for a positive slippage number and with the output for a negative slippage number, whose reset and readout inputs are connected with the first generator and whose storing inputs are connected with the associated output of the discriminator. With such arrangement, the result of a measurement during a complete measuring cycle remains preserved, and one gains sufficient time to utilize the measurement. If one has sufficient time for the evaluation and utilization then this means that the circuit connected thereto can operate at lower frequency.

It is favorable if, with a four-wheel motor vehicle, the first generator is provided at a front wheel and a rear wheel each, and the second generator is provided at the other front wheel and at the other rear wheel, if a counter-decoding circuit/storage-unit combined into a first decision unit is provided for the two front wheels, if a second decision unit is provided for the two rear wheels and if a third decision unit is provided which is connected with a generator of the one output frequency of one of the front wheels, and with a generator of the other output frequency of the rear wheels, if the outputs of the three-decision units are connected with three inputs of a conventional logic element, if the logic element is provided with four outputs connected with the valves, and if the valves are connected in a conventional manner in the brake pressure lines. It is possible in this manner to determine in a digital manner whether one of four wheels, whether two wheels of four wheels or whether three wheels of four wheels slip or spin. Therebeyond, it is also possible to ascertain which wheel slips and whether it is within a critical slippage range or not. The latter is possible for the reason that the decoding circuit has the capacity to respond at a predetermined adjustable slippage number as is known with such conventional types of circuits.

It is also appropriate if a pulse-forming stage is connected between the generators and the associated counter. This measure reduces considerably the requirements as regards the shape of the output voltages of the generators and assures that the counters always receive such a voltage shape as can also be utilized and processed thereby.

Accordingly, it is an object of the present invention to provide an installation for determining the slippage of motor vehicle wheels which eliminates by simple means the aforementioned shortcomings and drawbacks encountered heretofore.

Another object of the present invention resides in an installation of the type described above which is simple in construction, reliable in operation, and utilizes conventional standardized parts that are commercially available in the computer industry.

A further object of the present invention resides in an installation for determining the slippage of motor vehicle wheels whose parts do not require special precautions as regards tolerances and identity of characteristics to assure proper operation of the system.

Still another object of the present invention resides in an installation for determining the slippage of motor vehicle wheels which is free of uncontrollable parameters or of parameters difficult to control without involving unreasonable expenditures.

A further object of the present invention resides in a system for determining according to the digital principle which of the four wheels is or are spinning and for simultaneously determining the extent of the spinning.

These and further objects, features and advantages of the present invention will become more obvious from the following description when taken in connection with the accompanying drawing which shows, for purposes of illustration only, several embodiments in accordance with the present invention, and wherein;

FIG. 1 is a schematic block diagram of an installation for determining the slippage of the wheels in accordance with the present invention;

FIG. 2 is a diagram representing the output pulses of a first type of generator;

FIG. 3 is a diagram representing the output pulses of a second type of generator;

FIG. 4 is a block diagram, similar to FIG. 1, illustrating the present invention in still further simplified form;

FIG. 5 is a table indicating the operating conditions for the system illustrated in FIG. 4; and FIG. 6 is a schematic block diagram for an installation determining the slippage of a four-wheel motor vehicle.

Referring now to the drawing wherein like reference numerals are used throughout the various views to designate like parts, and more particularly to FIG. 1, reference numerals 11 and 12 schematically indicate two wheels of a motor vehicle which possess a common axis 13 but which can rotate independently of one another. A first gearwheel 14 is connected with the wheel 11 and a second gearwheel 16 with the wheel 12. The tooth division of the two gearwheels 14 and 16 is different. Let it be assumed in the illustrated embodiment that altogether 50 teeth of the gearwheel 16 correspond to one tooth of the gear wheel 14. A magnet (not shown) is coordinated to each gearwheel 14 and 16 whose poles terminate with a small gap at the circumference of the gearwheels 14 and 16 and in whose airgap are disposed the gearwheel 14 and 16. This airgap is enlarged when the pole is opposite a tooth gap and is reduced if the pole is opposite a tooth. Voltages occuring at a coil of the magnet in the rhythm of these airgap changes are taken off by way of lines 17 and 18 and are shaped by conventional trigger devices 19 and 21. Since such trigger devices are of conventional construction and operate in a conventional manner, the details thereof are not illustrated herein. A pulse according to FIG. 2 thus appears in the output line 22 of trigger 19 whereas a pulse according to FIG. 3 appears in the output line 23 of the trigger 21. If the gearwheel 16 has altogether 50 times more teeth than the gear wheel 14, then 50 times more pulses occur in FIG. 3 than in FIG. 2. If therefore the generator of the wheel 11 consisting of gearwheel 14, magnet and coil, produces z pulses in one cycle, then the generator of the wheel 12 consisting of the gear wheel 16, a magnet, and a further coil, produces a number of n·z pulses and, in that case, the number n=50. The output line 22 is connected conventionally with a setting-reset input 24 of a conventional counter of any known construction whereas the output line 23 is conventionally connected with a counting input 27 of the counter 26. A decoding circuit 28 of conventional construction is combined with the counter 26 whose functions will be explained more fully hereinafter. The decoder circuit 28 has two output lines 29 and 31 which lead to the storage inputs 32 and 33 of conventional storage devices 34 and 36. Additionally, the output line 22 is connected by way of a line 37 with conventional reset- readout-inputs 38 and 39. The storage devices 34 and 36 have outputs 41 and 42. Since the counter 26, the decoding circuit 28, as well as the storage devices 34 and 36 are of conventional, well-known construction, standardized in connection with digital counters and computers, and since the details thereof form no part of the present invention, such details are not shown herein.

Operation

The installation illustrated in FIGS. 1, 2 and 3, operates as follows:

It is assumed that both wheels 12 and 11 rotate synchronously. The pulse 43 (FIG. 2) of the first generator opens the counter 26 and clears its content insofar as it had a content. Fifty pulses 44 (FIG. 3) then reach the counter 26 whereupon the pulse 46 (FIG. 2) appears. The decoding circuit coordinates, for example, with the aid of conventional diode gates, the number diode 0 to the counter content 50, which means that the slippage is 0 which, in fact, is also the case because the wheels 11 and 12 operate synchronously. Consequently, the condition 0 prevails in the output lines 29 and 31. Also, this condition prevails in the outputs 41 and 42. The pulse 46 then clears the content of the counter 26 and also of the storage devices 34 and 36 insofar as the two storage devices had a content.

Let it now be assumed that the wheel 12 rotates faster than the wheel 11. Between two pulses 43 and 46 the counter then counts, for example, the number 53. The decoding circuit 28 coordinates to this number a predetermined slippage, for example, +4 to +6 percent. This signal appears in the output line 31 associated with the positive slippages at the end of a cycle and reaches with the aid of the pulses 46 the storage device 36. The signal corresponding to this slippage is stored therein until a new pulse again appears in the output line 22 over line 37.

Consequently, a pulse always appears in the output 42, when the counter condition of the counter 26 during resetting was larger than the number 50, whereas a signal appears in the output 41 if during the zero-setting the counter condition of the counter 26 was smaller than 50.

However, it is not that discrete values for predetermined slippage exist in the output lines 29, 31 and in the outputs 41 and 42. There appear in these output lines and outputs, only constant signals, i.e., signals always remaining constant, when a predetermined slippage is exceeded. The installation possesses therefore a threshold value that can be adjustable.

How a predetermined counter content can be coordinated to a predetermined slippage becomes clear from the following table.

TABLE 1

| Counter condition of counter 26: | Slippage of wheel 11 compared to wheel 12 in percentage |
|---|---|
| . | . |
| . | . |
| . | . |
| 53 | +4–+6 |
| 52 | +2–+4 |
| 51 | 0–+2 |
| 50 | 0 |
| 49 | 0––2 |
| 48 | –2––4 |
| 47 | –4––6 |
| . | . |
| . | . |
| . | . |

Consequently, during the rotational speed comparison always the fastest rotating speed serves as norm or reference as it is assumed that it has a secure adhesion to the road.

FIG. 4 illustrates the arrangement described hereinabove in still more simplified form. Generators 47 and 48 are coordinated to the wheels 11 and 12 which feed a decision unit 49 that indicates whether the slippage is 0 or lies above a predetermined positive or below a predetermined negative gate value. The condition A exists with a predetermined slippage occurs having a negative sign. The condition B occurs when a predetermined slippage with positive sign occurs, and the condition 0 exists if no slippage occurs. These conditions are illustrated in tabulated form in FIG. 5.

With a four-wheel motor vehicle, the rotational speeds of four wheels are to be compared. This is taken into consideration in FIG. 6 where, in addition to the wheels 11 and 12 with the generators 47 and 48 thereof, additionally wheels 51 and 52 together with the generators 53 and 54 are provided, whereby the generator 53 is identical to the generator 47 and the generator 54 is identical to the generator 48.

A conventional second decision unit 56 again makes the decision as regards the rotational speed conditions at the wheels 51 and 52 whereas a conventional third decision unit 57 provides information concerning the rotational speed conditions at the wheels 11 and 52. The decision of the decision units 49, 56 and 57 are fed by way of lines 58, 59 and 61 to a conventional logic circuit 62 such as a switching element of conventional construction, which possess four outputs with series-connected amplifiers 63, 64, 66 and 67. The outputs of the amplifiers are connected with the magnetic valves of the wheels 11, 12, 51 and 52. For the sake of simplicity, the wheels are designated in FIG. 6 and in the following table 2 by reference character R and the associated number.

The operation of the logic element 62 can be best understood from the following table 2.

In this table 2, reference character M11 indicates the magnetic valve of wheel 11, M12 the magnetic valve of wheel 12; etc.

One succeeds by the present invention to control those magnetic valves by Yes/No decisions whose associated wheels have a slip that is above an adjustable boundary limit. The blocking or locking together with its sometimes rather serious consequences is reliably prevented thereby. The installation, however, is not more expensive thereby than known installa-

TABLE 2

| Rotational speed conditions | | Condition at— | | | Actuation |
|---|---|---|---|---|---|
| | | $E_1$ | $E_2$ | $E_3$ | |
| R11 | Slower than R12; R51; R52 | B | B | O | M11 |
| R12 | Slower than R11; R51; R52 | A | O | O | M12 |
| R51 | Slower than R11; R12; R52 | O | O | B | M51 |
| R52 | Slower than R11; R12; R51 | O | A | A | M52 |
| R11 = R12 | Slower than R51 = R52 | O | B | O | M11+M12 |
| R51 = R52 | Slower than R11 = R12 | O | A | O | M51+M52 |
| R11 = R51 | Slower than R12 = R52 | B | B | B | M11+M51 |
| R12 = R52 | Slower than R11 = R51 | A | A | A | M12+M52 |
| R11 = R52 | Slower than R12 = R51 | B | O | B | M11+M52 |
| R12 = R51 | Slower than R11 = R52 | A | O | A | M12+M52 |
| R12; R51; R52 | Slower than R11 | A | O | | M12; M51; M52 |
| R11; R51; R52 | Slower than R12 | B | O | O | M11; M51; M52 |
| R11; R12; R52 | Slower than R51 | O | O | A | M11; M12; M52 |
| R11; R12; R51 | Slower than R52 | O | B | B | M11; M12; M51 | tions because, for example, counting decades, decoding circuits, are available in the open market as ready made, commercially available structural elements at constantly falling prices.

While we have shown and described two embodiments in accordance with the present invention, it is understood that the same if not limited thereto but is susceptible of numerous changes and modifications as known to a person skilled in the art, and we therefore, do not wish to be limited to the details shown and described herein but intend to cover all such changes and modifications as are within the scope of those skilled in the art.

We claim:

1. An installation for determining the slippage of motor vehicle wheels, in which a first generator is provided at a first wheel and has an output frequency at a rotational speed of this first wheel, and a second generator is provided at a second wheel and has an output frequency at the same rotational speed which is proportional to the output frequency of the first generator, characterized in that both generators are operatively connected with a counter means having first input means serving as setting—as well as reset—input and second input means serving as counter input, the first generator being connected with the first input means of the counter means and the second generator with the second input means of the counter means, decoding circuit means operatively connected with said counter means and operable to coordinate a predetermined slippage number to a predetermined counter content and including first and second output means, said first output means being correlated to a negative slippage number and said second output means to a positive slippage number.

2. An installation according to claim 1, characterized in that one storage means is connected to a respective one of said first and second output means, the storage means having reset and readout input means as well as storing input means, the reset and readout input means being operatively connected with the first generator and the storing input means with the associated output means of the decoding circuit means.

3. An installation according to claim 2, characterized in that with a four-wheel motor vehicle, a first generator is provided at a front wheel and at a rear wheel, and a second generator at the other front wheel and at the other rear wheel, a first counter/decoding circuit-storage unit combined into a first decision unit being provided for the two front wheels, a second decision unit being provided for the two rear wheels, and a third decision unit being provided which is operatively connected with a generator of one output frequency of one of the two front wheels and with a generator of the other output frequency of the two rear wheels, said three decision units having output means being operatively connected with three inputs of a logic element, and said logic element having four outputs operatively connected with valve means, and said valve means being connected in a respective brake pressure medium line.

4. An installation according to claim 3, characterized in that a pulse shaper means is connected between a respective generator and the corresponding counter means.

5. An installation according to claim 1, characterized in that a pulse shaper means is connected between a respective generator and the corresponding counter means.

6. An installation for determining the slippage of motor vehicle wheels, characterized by first generator means at a first wheel having an output frequency $z$ at a rotational speed $u$ of this first wheel, second generator means at a second wheel having an output frequency $n \cdot z$ at the same rotational speed, and digital counter and decoder means operatively connected with said generator means to produce an output correlated to sign and value of the slippage of a given wheel.

7. An installation according to claim 6, characterized in that $n$ is an integer greater than 1.

8. An installation according to claim 6, characterized by storage means operatively connected with said decoder means.